Figure 1:
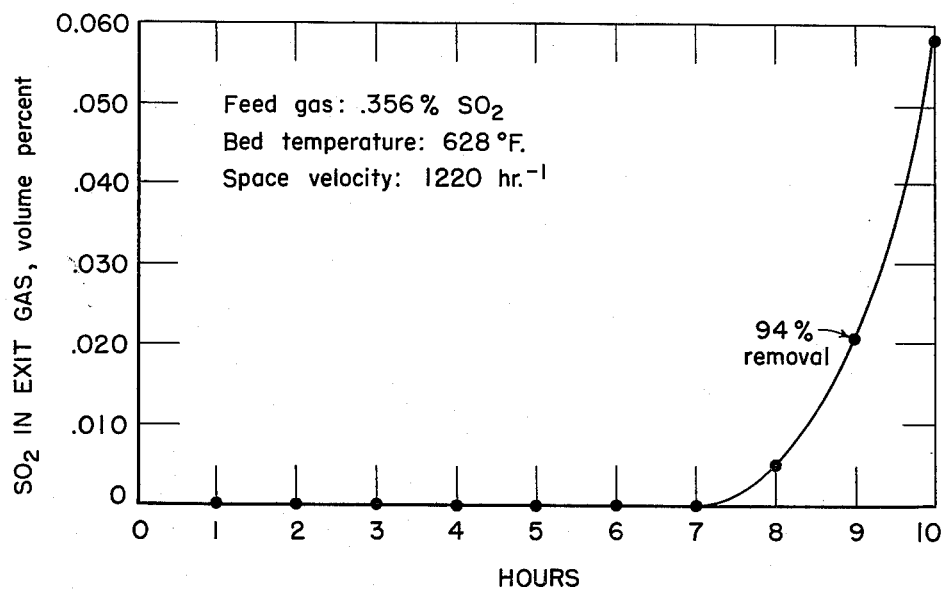

Absorption of SO₂ with an alkalized alumina.

United States Patent Office 2,992,884
Patented July 18, 1961

2,992,884
PROCESS FOR THE REMOVAL OF SULFUR OXIDES FROM GASES
Daniel Bienstock and Joseph H. Field, Pittsburgh, Pa., assignors to the United States of America as represented by the Secretary of the Interior
Filed Oct. 7, 1959, Ser. No. 845,037
14 Claims. (Cl. 23—2)
(Granted under Title 35, U.S. Code (1952), sec. 266)

The invention herein described and claimed may be manufactured and used by or for the Government of the United States of America for governmental purposes without the payment of royalties therein or therefor.

The invention relates to a method for removal of $SO_2$ from hot oxygen-containing gases, such as flue gases and smelter gases.

Contamination of the atmosphere by sulfur dioxide, whether present in dilute concentration of 0.05 to 0.3 volume percent as in power plant flue gases, or in higher amounts of 5 to 10 percent as in ore roaster gases, has been a public health problem for many years. The undesirability of sulfur dioxide in the atmosphere has long been recognized because of its highly irritating effect on the respiratory system, its adverse effect on plant life and corrosive attack on many metals, fabrics, and building materials. It is estimated that 21 million tons of sulfur dioxide are emitted into the atmosphere each year in the United States due to the combustion of fuel oil and coal. Of this amount around 40 percent is produced in the generation of electric power.

Most processes proposed or employed for the removal of sulfur dioxide from flue gases employ liquid phase absorption techniques. These are not too satisfactory, since liquid absorption acts to cool the partially scrubbed gas, which consequently has a higher density and tends to settle in the vicinity of the stack. Local pollution may become worse, even though the amount of sulfur compounds emitted to the atmosphere is reduced.

It is a main object of this invention, therefore, to remove sulfur dioxide from hot gases containing the same without effecting any cooling thereof.

It is a further object of this invention to remove sulfur dioxide from hot gases containing the same by passing the gases over an absorbent comprising an alumina or chromia support having dispersed thereon an alkali metal oxide, such as sodium oxide.

It is a further object of this invention to regenerate the used absorbent with a hot reducing gas and recycle the so regenerated absorbent to the absorption stage.

Further objects will become apparent from a consideration of the rest of the disclosures and claims.

According to the present invention, the hot sulfur dioxide-containing gas, such as a smelter gas or flue gas for example, is contacted with an absorbent material consisting of an alumina or chromia support having dispersed thereon an alkali metal oxide, e.g., sodium oxide. Scrubbed gas with its sulfur dioxide content substantially removed is separated and led to the stack. Spent absorbent is regenerated with a hot reducing gas such as producer gas, hydrogen, methane, etc., which reacts with the sulfur content to form $H_2S$, and free sulfur. If the reducing gas contains free CO then COS is also formed. The regenerated absorbent is recycled to the absorption stages and the off gas may be treated by known methods to recover the sulfur.

In addition to sulfur dioxide there are very small concentrations of sulfur trioxide and sulfuric acid in flue gases and smelter gases as well as in the off gases from contact acid plants for the manufacture of sulfuric acid. These contaminants are troublesome both from their health hazard as well as their highly corrosive nature to plant equipment. $SO_3$ and $H_2SO_4$ are readily absorbed by the alkalized alumina and chromia.

Figure 2:
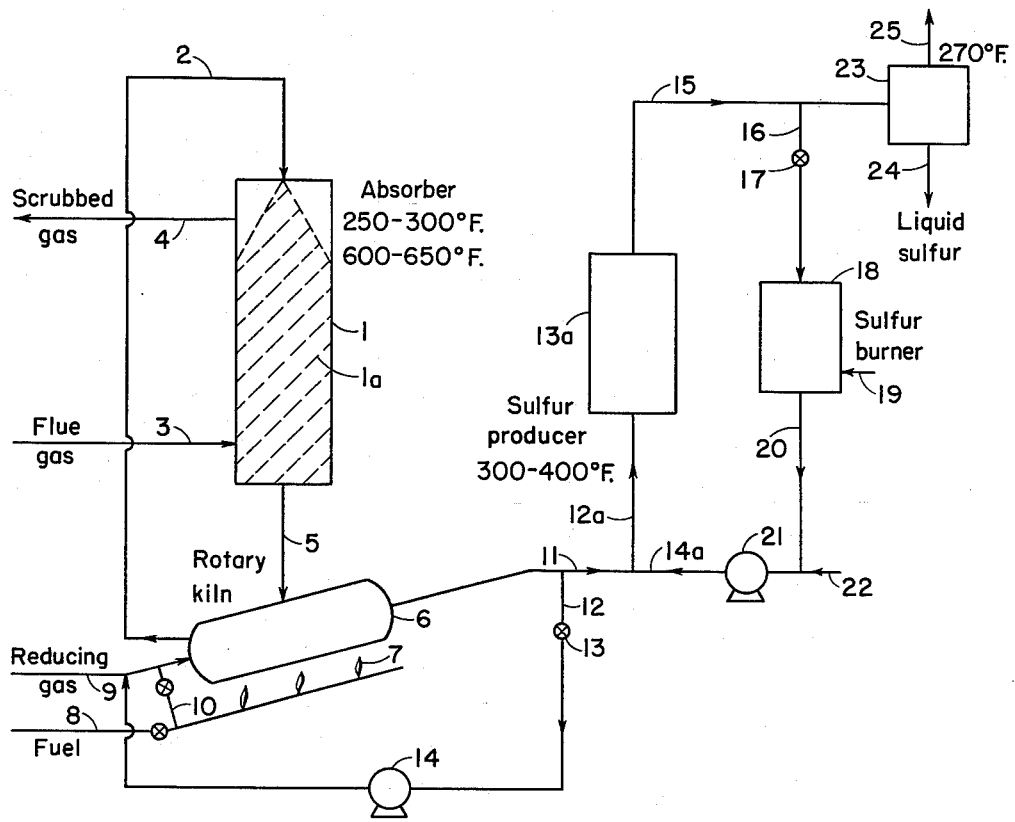

In the drawing,
FIGURE 1 is a graph showing the decrease in absorption capacity of the absorbent with respect to time on stream.
FIGURE 2 is a schematic drawing of one form of apparatus employed.
The following examples illustrate various aspects of the process:

EXAMPLE 1.—PREPARATION OF THE ALUMINA ABSORBENT

To a solution of 980 grams of $Al_2(SO_4)_3 \cdot 18H_2O$ in 1200 cc. of water was added a solution of 560 grams $Na_2CO_3$ in 1500 cc. of water. Both solutions had been heated to 90° C. before reacting. The mixture was stirred mechanically, then allowed to settle, and the supernatant liquid was decanted. The precipitate was washed twice with 5 gallons of water containing 2% $Na_2CO_3$, decanting between washings, then filtered, dried in an oven at 130° C. for 60 hours, and crushed to 8–16 mesh. It was then heated with hydrogen at 600°–630° C. for 20 hours, and sieved to 8–24 mesh.

The analysis of the alkalized alumina absorbent was as follows:

Table I

| Component | Original preparation (weight percent) | |
|---|---|---|
| | Heated to 130° C. | Heated to 600° C. |
| $Na_2O$ | 18.5 | 28.7 |
| $Al_2O_3$ | 41.6 | 66.5 |
| $SO_3$ | 6.3 | 2.8 |
| $CO_2$ | 19.1 | 1.8 |
| $H_2O$, by difference | 14.5 | |

Instead of adding together a solution of aluminum and sodium salts, alumina particles may be treated with solutions of sodium salts which decompose at high temperatures to sodium oxide, e.g. the carbonate, nitrate etc.

Sodium oxide is a necessary constituent in this absorbent. Reducing the sodium content by water extraction lowered the adsorptive capacity, and complete removal destroyed it completely. These results are shown in the following table using a fixed bed of absorbent and a simulated flue gas containing 0.3 volume percent of $SO_2$, 13.0 $CO_2$, 6.0 $O_2$, 6.7 $H_2O$ and 74.0 $N_2$:

Table II

EFFECT OF ALKALI CONTENT ON THE ABSORPTION OF SULFUR DIOXIDE

Charge: Alkalized alumina
Volume of absorbent: 50 cc.
Space velocity, hr.$^{-1}$: 1050
Bed temperature, ° F.: 615–625

| Number of aqueous extractions | Sodium content, weight percent | Sodium to aluminum ratio | Weight of $SO_2$ absorbed at breakthrough,[1] gms. |
|---|---|---|---|
| 2 (cold) | 21.3 | 0.61 | 3.70 |
| 4 (cold) | 18.5 | 0.49 | 3.58 |
| 8 (cold) | 16.4 | 0.41 | 2.35 |
| 16 (cold) | 12.0 | 0.28 | 2.22 |
| 4 (hot) | 0.0 | 0.0 | 0.17 |

[1] Breakthrough is defined as 90 percent removal of sulfur dioxide.

Other soluble aluminum salts may be substituted for the sulfate. In fact, there is some evidence that other salts result in somewhat more effective absorbents, possibly because in the case of aluminum sulfate some sulfate is retained in the absorbent. Aluminum nitrate, for example, produces an absorbent having an improved absorptive capacity.

EXAMPLE 2.—PREPARATION OF A CHROMIA ABSORBENT

To a solution of 3670 grams of $Cr_2(SO_4)_3 \cdot 5H_2O$ in 7300 cc. of water was added a solution of 2660 grams of $Na_2CO_3$ in 8000 cc. of water. Both solutions had been heated to 90° C. before reacting. The mixture was stirred mechanically, then allowed to settle and the supernatant liquid was decanted. The precipitate was washed twice within 5 gallons of water, decanting between washings, then filtered, dried in an oven at 130° C. for 60 hours and crushed to 8–16 mesh. It was then heated with hydrogen at 600°–630° C. for 20 hours and sieved to 8–24 mesh.

The composition was as follows:

| Component: | Weight percent |
| --- | --- |
| $Cr_2O_3$ | 71.9 |
| $Na_2O$ | 26.2 |
| $SO_3$ | 0.7 |
| $CO_2$ | 1.2 |

The absorption of $SO_2$ with this chromia-alumina absorbent was as follows, at breakthrough:

*Table III*

| | g. $SO_2$/100 g. absorbent | Vol. $SO_2$/vol. absorbent |
| --- | --- | --- |
| Absorption at 130° C | 11.8 | 37.6 |
| Absorption at 330° C | 16.3 | 51.9 |

EXAMPLE 3.—PREPARATION OF A POTASSIUM OXIDE-ALUMINA ABSORBENT

To a solution of 1075 grams of $Al_2(SO_4)_3 \cdot 18H_2O$ in 2150 cc. of water was added 780 grams of $K_2CO_3$ in 2400 cc. of water. Both solutions had been heated to 90° C. before reacting. The mixture was stirred mechanically, then allowed to settle and the supernatant liquid decanted. The precipitate was washed twice with 5 gallons of water, decanting between washings, then filtered, dried in an oven at 130° C. for 72 hours and crushed to 8–16 mesh. It was then heated with hydrogen at 600°–630° C. for 20 hours and sieved to 8–24 mesh.

The composition of the absorbent produced is as follows:

| Component: | Water percent |
| --- | --- |
| $K_2O$ | 20.6 |
| $Al_2O_3$ | 72.8 |
| $SO_3$ | 6.3 |
| $CO_2$ | 0.3 |

The absorption of $SO_2$ with this potassium-alumina composition was as follows, at breakthrough:

*Table IV*

| | g. $SO_2$/100 g. absorbent | Vol. $SO_2$/vol. absorbent |
| --- | --- | --- |
| Absorption at 130° C | 6.5 | 13.9 |
| Absorption at 330° C | 6.4 | 13.7 |

The alkali metal oxide content may vary widely and still produce an effective absorbent. However, activity decreases with lower alkali metal content so that as a practical matter too low a content should be avoided for best results. In the case of sodium, an operative lower limit is around 10 percent alkali metal content.

Any of the alkali metal oxides may be employed, although they are not all equally effective. Potassium oxide, for example, is not as active as sodium oxide. In view of the ready availability and low cost, sodium oxide is preferred as the alkalizer.

EXAMPLE 4.—$SO_2$ ABSORPTION

The removal of sulfur dioxide with the alkalized alumina or chromia is quantitatively complete and is effected by oxidation to sulfur trioxide and formation of the alkali metal sulfate. FIGURE 1 shows the results achieved in the absorption of $SO_2$ from simulated flue gas, having by volume 0.356 percent $SO_2$ content, in a fixed bed absorption with a bed temperature of 628° F., a space velocity of 1220 hr.$^{-1}$, and $Al_2O_3$-$Na_2O$ absorbent having a Na content of 19.5 percent. After nine hours the rate of absorption had decreased to 94 percent $SO_2$ removal. The total amount of $SO_2$ removed up to this point amounted to 17.5 g. of $SO_2$ per 100 g. of absorbent, or 32.4 volumes of $SO_2$ per volume of charge. Identical results were obtained at 280° F.

The invention will be more completely understood from a consideration of the embodiment depicted in FIGURE 2 of the drawing, which is largely schematic. As shown therein, 1 is an absorption vessel, or absorber, which contains hot solid alkalized alumina absorbent 1a. The latter is introduced in vessel 1 as a falling bed through line 2, which may be a gas lift, bucket elevator, screw conveyor, etc. Flue gas is introduced in the bottom of the absorber via line 3, and passes upward through the absorber 1, countercurrent to the downwardly moving bed of absorbent. Scrubbed flue gas with substantially all sulfur dioxide removed or only an insignificant amount left, is removed from the absorber by line 4 for venting to the atmosphere through a stack. Absorbent leaves the bottom of absorber 1 through line 5 and goes to a rotary kiln regenerator 6 heated by burner 7, fuel for which is supplied by line 8. Producer gas, as a reducing gas, is supplied to the kiln by line 9, and may also be supplied as the fuel through line 10.

In the kiln, the spent absorbent is regenerated by removal of the sulfur as $H_2S$, COS and free sulfur. Gas leaving kiln 6 through line 11 contains $H_2S$, COS, S, $CO_2$, $H_2$ and CO may be recycled in part back to the kiln through line 12, valve 13 and pump 14. The rest of the effluent gas is led through line 12a to sulfur producer 13a containing a bauxite catalyst and maintained at a temperature of 300° to 400° F. Sulfur dioxide is led into the sulfur producer through line 14a and 12a, as will appear hereinafter, and the sulfur formed leaves the producer in gaseous form through line 15. One portion is led through line 16 and valve 17 to a sulfur burner 18. It is here burned with air admitted through line 19 to form sulfur dioxide. This leaves the burner through line 20, passes through pump 21 and is admitted to the sulfur producer through lines 14 and 12a. Additional $SO_2$ may be introduced via line 22, if needed for starting up purposes or for other reasons.

The rest of the effluent from the sulfur producer is led to a recovery chamber 23 containing an electrostatic precipitator, and maintained at about 270° F. Liquid sulfur is removed through line 24, and the unreacted gases are removed through line 25.

Although a moving bed absorbent process is described, it is obvious that other well known techniques for employing solid absorbents may be employed such as fluidized or fixed bed operations. With fixed bed operation, a plurality of absorbers are employed which are cyclically placed on stream and on regeneration, so that uninterrupted operation may be obtained.

In the case of a flue gas, the temperature of the absorber is either 250–300° F. or 600–650° F. depending on whether there is any heat exchange with the air employed for combustion in the power plant furnace. A temperature of 1100° F. in the regenerator is sufficient to affect complete regeneration of the absorbent, employing producer gas. No loss of activity or physical attrition was noted in the absorbent after passing through a number of absorption-regeneration cycles.

It will be understood that various changes and modifications may be made in the embodiments set forth above within the scope of the appended claims without departing from the spirit and scope of this invention.

We claim:

1. A method for the removal of acidic oxygenated sulfur compounds from a hot gas which comprises contacting the hot gas with an absorbent material comprising an alkali metal oxide dispersed on a carrier selected from the group consisting of alumina and chromia, said adsorbent being prepared by adding an aqueous solution of an alkali metal carbonate to an aqueous solution of a compound selected from the group consisting of aluminum and chromium salts to form a precipitate, heating the precipitate to form the oxides, and then heating the oxides in the presence of hydrogen.

2. A method for the removal of $SO_2$ from a hot oxygen-containing gas containing the same which comprises contacting the hot gas with an absorbent material comprising an alkali metal oxide dispersed on a carrier selected from the group consisting of alumina and chromia, said adsorbent being prepared by adding an aqueous solution of an alkali metal carbonate to an aqueous solution of a compound selected from the group consisting of aluminum and chromium salts to form a precipitate, heating the precipitate to form the oxides, and then heating the oxides in the presence of hydrogen.

3. A method for removal of $SO_2$ from a hot oxygen-containing gas containing the same which comprises contacting the hot gas with an absorbent material consisting of sodium oxide dispersed on an alumina carrier, said adsorbent being prepared by adding an aqueous solution of sodium carbonate to an aqueous solution of an aluminum compound to form a precipitate, heating the precipitate to form the oxides, and then heating the oxides in the presence of hydrogen.

4. A method for the removal of $SO_2$ from hot flue gas which comprises contacting the gas at a temperature of about 250° F. to about 650° F. with an absorbent material comprising an alkali metal oxide dispersed on a carrier selected from the group consisting of alumina and chromia, said adsorbent being prepared by adding an aqueous solution of an alkali metal carbonate to an aqueous solution of a compound selected from the group consisting of aluminum and chromium salts to form a precipitate, heating the precipitate to form the oxides, and then heating the oxides in the presence of hydrogen.

5. A method for the removal of $SO_2$ from hot flue gas which comprises contacting the hot gas at a temperature of about 250° F. to about 650° F. with an absorbent material comprising sodium oxide dispersed on an alumina carrier, said adsorbent being prepared by adding an aqueous solution of sodium carbonate to an aqueous solution of an aluminum compound to form a precipitate, heating the precipitate to form the oxides, and then heating the oxides in the presence of hydrogen.

6. A method for the removal of $SO_2$ from hot flue gas which comprises contacting the hot gas at a temperature of about 250° F. to about 650° F. with an absorbent material comprising sodium oxide dispersed on a chromia carrier, said adsorbent being prepared by adding an aqueous solution of sodium carbonate to an aqueous solution of a chromium salt to form a precipitate, heating the precipitate to form the oxides, and then heating the oxides in the presence of hydrogen.

7. A method for the removal of $SO_2$ from a hot oxygen-containing gas which comprises contacting in a treating zone the hot gas containing sulfur dioxide with an absorbent material comprising an alkali metal oxide dispersed on a carrier selected from the group consisting of alumina and chromia, said adsorbent being prepared by adding an aqueous solution of an alkali metal carbonate to an aqueous solution of a compound selected from the group consisting of aluminum and chromium salts to form a precipitate, heating the precipitate to form the oxides, and then heating the oxides in the presence of hydrogen, whereby the $SO_2$ is removed by the absorbent, removing the essentially sulfur dioxide-free gas from the treating zone, and reactivating the spent absorbent by contacting it at an elevated temperature with a reducing gas.

8. A method for the removal of $SO_2$ from hot flue gas which comprises contacting the gas in a treating zone with an absorbent consisting of sodium oxide dispersed on alumina carrier, said adsorbent being prepared by adding an aqueous solution of sodium carbonate to an aqueous solution of an aluminum compound to form a precipitate, heating the precipitate to form the oxides, and then heating the oxides in the presence of hydrogen, maintaining said treating zone at a temperature of about 250° F. to about 650° F., whereby the $SO_2$ is removed by the absorbent, removing the essentially $SO_2$-free flue gas from the treating zone, and reactivating the spent absorbent by contacting it at an elevated temperature with a reducing gas.

9. A method for the removal of $SO_2$ from hot flue gas which comprises contacting the gas in a treating zone with an absorbent consisting of sodium oxide dispersed on a chromia carrier, said adsorbent being prepared by adding an aqueous solution of sodium carbonate to an aqueous solution of a chromium salt to form a precipitate, heating the precipitate to form the oxides, and then heating the oxides in the presence of hydrogen, said absorbent being prepared by the steps comprising precipitating from solution a member of the class consisting of chromium hydroxide and carbonate, employing a sodium compound, and heating the precipitate to form the oxides, maintaining said treating zone at a temperature of about 250° F. to about 650° F., whereby $SO_2$ is removed by the absorbent, removing the essentially $SO_2$-free flue gas from the treating zone, and reactivating the spent absorbent by contacting it at an elevated temperature with a reducing gas.

10. The method of claim 8 wherein the spent absorbent is reactivated by contacting it with producer gas at a temperature of about 1100° F.

11. A continuous method for the removal of $SO_2$ from a hot oxygen-containing gas which comprises passing said gas through a body of absorbent in a treating zone, said absorbent comprising an alkali metal oxide on carrier selected from the group consisting of alumina and chromia, said adsorbent being prepared by adding an aqueous solution of an alkali metal carbonate to an aqueous solution of a compound selected from the group consisting of aluminum and chromium salts to form a precipitate, heating the precipitate to form the oxides, and then heating the oxides in the presence of hydrogen, removing the gas from the treating zone, removing spent absorbent from the treating zone and conveying it to a regenerating zone, contacting the spent absorbent with a reducing gas at an elevated temperature to convert the sulfur present to hydrogen sulfide, thereby regenerating the absorbent and recycling the regenerated absorbent to the treating zone.

12. A continuous method for the removal of $SO_2$ from hot flue gas which comprises passing said gas through a body of absorbent in a treating zone at a temperature of about 250° F. to about 650° F., said absorbent consisting of sodium oxide dispersed on an alumina carrier, said adsorbent being prepared by adding an aqueous solution of sodium carbonate to an aqueous solution of an aluminum compound to form a precipitate, heating the precipitate to form the oxides, and then heating the oxides in the presence of hydrogen, removing the treated flue gas from the treating zone, removing spent absorbent from the treating zone, conveying the spent absorbent to a regenerating zone, contacting the spent absorbent with a reducing gas at an elevated temperature, whereby the sulfur content of the spent absorbent is substantially completely removed by conversion to $H_2S$ and the spent absorbent is regenerated, and recycling the regenerated absorbent to the treating zone.

13. A continuous method for the removal of $SO_2$ from hot flue gas which comprises passing said gas through a body of absorbent in a treating zone at a temperature of about 250° F. to about 650° F., said absorbent consisting of sodium oxide dispersed on a chromia carrier, said adsorbent being prepared by adding an aqueous solution of sodium carbonate to an aqueous solution of a chromium salt to form a precipitate, heating the precipitate to form the oxides, and then heating the oxides in the presence of hydrogen, said absorbent being prepared by the steps comprising precipitating from solution a member of the class consisting of chromium hydroxide and carbonate, employing a sodium compound, and heating the said precipitate to form the oxides, removing the treated flue gas from the treating zone, removing spent absorbent from the treating zone, conveying the spent absorbent to a regenerating zone, contacting the spent absorbent with a reducing gas at an elevated temperature, whereby the sulfur content of the spent absorbent is substantially completely removed by conversion to $H_2S$ and the spent absorbent is regenerated, and recycling the regenerated absorbent to the treating zone.

14. The method of claim 12, wherein the reducing gas consists of producer gas, and the temperature of reactivation is about 1100° F.

References Cited in the file of this patent

FOREIGN PATENTS 135,333   Australia _____ June 24, 1947